April 23, 1946.  J. B. GAFFNEY  2,399,015
MATERIAL LEVEL INDICATOR
Filed July 7, 1943
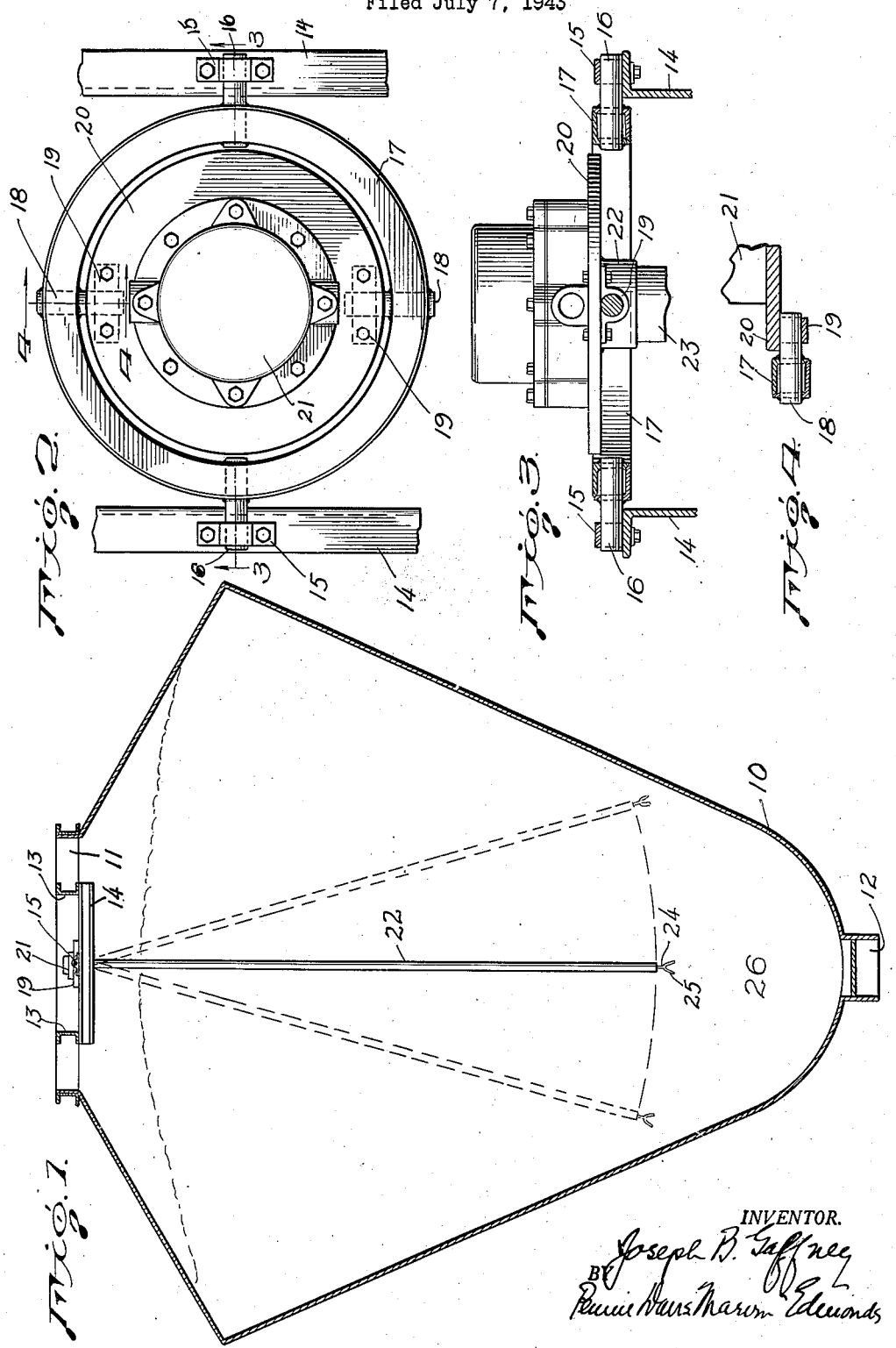
INVENTOR.
Joseph B. Gaffney Patented Apr. 23, 1946

2,399,015

UNITED STATES PATENT OFFICE 2,399,015

MATERIAL LEVEL INDICATOR

Joseph B. Gaffney, Hokendauqua, Pa., assignor to Fuller Company, Catasauqua, Pa., a corporation of Delaware Application July 7, 1943, Serial No. 493,746

4 Claims. (Cl. 177—311)

The present invention relates to indicators or electrical switch operating mechanisms and more particularly low level bin indicators for use in connection with bins or bunkers for the storage of pulverulent materials, to open or close electrical circuits when the stored pulverulent, crushed or granular material reaches or falls below a predetermined desirable level. The indicator may be used, for example, in storage bins for pulverized coal, cement, lime, flour, starch and other materials having similar physical characteristics, to open or close signal circuits and circuits controlling the flow in pulverulent material conveying systems.

Pulverulent materials have peculiar characteristics which make it difficult to obtain accurate indications of the safe minimum quantity of material actually in storage. When delivered to the bin or bunker they are frequently in an aerated state and are so fluid in character that they surge and splash. Again the material in a bin is likely to shift in large masses and during such shifting exert relatively large forces on anything in its way or resisting such movement.

It has been the practice to mount low level indicators by running the signal elements down close to the side of a bin with short braces extending out from the side to hold them rigidly in position. This bracing enabled the indicator to resist motion of the shifting mass. Frequently, however, it is not desirable to mount the indicator close to the side of bin since false or highly inaccurate readings sometimes result. This may be caused by "piping" or "channeling" of the material upon withdrawal, in which case the material stands almost vertically along the side walls. Under such conditions, with the indicator attached to the side wall, an indication is given that the bin contains material when as a fact very little or none can be withdrawn.

It is accordingly among the objects of the present invention to provide an indicator mounting means which overcomes the difficulties described above and assures positive and reliable operation of the indicator at all times, so that it may be used as a remote control device with a minimum of supervision.

The present invention is accordingly directed to a mounting for a low level indicator which will center it in the bin at the point where the maximum withdrawable material is most likely to be and at the same time permit it to move freely with the shifting mass of material. Such a construction will permit the indicator to be where the material is and so eliminate false indications and at the same time remove the necessity for the bracing which in some installations is quite cumbersome and together with its assembly on the job may cost substantially more than all the rest of the indicator combined.

The solution to the problem was found to be to protect the depending shaft of the low level indicator by means of a relatively large size pipe surrounding it and suspend the indicator and protecting pipe from overhead supports in such a way that the assembly could swing like a pendulum when disturbed by a mass movement of the material in the bin. Such a mounting is provided by gimbals somewhat similar to those used to mount a compass.

Further consideration indicated the advisability of a change in the type of indicator paddle normally used. Formerly it had been the practice to provide a paddle guard which resembled an umbrella over the paddle to protect it from material likely to grab and exert a pull upon it.

For a better understanding of the invention reference may be had to the accompanying drawing which is illustrative in character and is not to be taken as limiting.

Fig. 1 is an elevation of the indicator mounted in a bin or bunker filled with material and sectioned.

Fig. 2 is a plan view of the indicator mounting means.

Fig. 3 is an elevation of the indicator mounting means partly sectioned along line 3—3 of Fig. 2 to more clearly show the parts of the device.

Fig. 4 is a section detail along line 4—4 of Fig. 2.

In Fig. 1 is seen a catenary coal bin 10, having an inlet 11 and a discharge opening 12. Channel members 13 extend across inlet 11 and have welded or otherwise fastened to their under surfaces mounting channels 14 on which are bolted trunnions 15. Stub shafts 16 are journaled in trunnions 15 and are welded or otherwise fastened to diametrically opposite sides of outer ring 17, which likewise mounts inwardly extending stub shafts 18 the axis of which makes an angle of 90 degrees with that of stub shafts 16. The inwardly extending portions of stub shafts 18 are journaled in trunnions 19 mounted on the under side of inner ring 20.

Housing 21 is bolted to inner ring 20 and contains the switch mechanism of the low level indicator. The details of one form of this switch mechanism may be seen in United States Patent No. 2,116,075 granted to Lenhart on May 3, 1938 to which attention is invited for further illustration and in the interest of completeness of the present disclosure.

Extending downwardly from housing 21 is flanging 22 in which is firmly threaded depending pipe 23 of any desired length. Within and protected by pipe 23 is indicator rod 24 which is connected with the mechanism contained in housing 21. Rod 24 terminates in paddle 25 with sloping bifurcations which are not likely to be grabbed or pulled by the material.

It will be seen that as material 26 flows through outlet 12, voids will appear in the lower portion of bin 10 which will be filled by the shifting of material 26. As material 26 shifts, protecting pipe 23 and its enclosed rod 24 mounting paddle 25 are free to move with the material 26 as shown by the dotted lines in Fig. 1. This eliminates all necessity for expensive and obstructing bracing within the bin 10. This freedom of movement in all directions is made possible by inner and outer rings or gimbals 20 and 17 and the pivoting of stub shafts 18 and 16 in their respective trunnions 19 and 15. When the material 26 drops below paddle 25 which then hangs substantially vertically from housing 21 and gimbals or rings 17 and 20, the paddle 25 is free to rotate and actuate the signal mechanism in housing 21. The signal mechanism may be connected to operate both a visual indicator and an automatic or manual switch mechanism to supply additional material 26 and refill bin 10.

From the above description other means of solving the problem will be suggested. One such means which may be used where loads are light would be to substitute a flexible plate of rubber or like material for one or both of rings 17 and 20. Such a plate would have substantial thickness of as much as an inch or an inch and a half and could be directly mounted on channels 14. Housing 21 would be fastened to the rubber and rod 22 depend through a hole in its center. A perhaps better construction would be to have the rubber in the form of a disk of the same diameter as ring 17 and retain trunnions 15 and stub shafts 16. A reinforcing element may be desirable where stub shafts 16 are mounted in the rubber disk.

I claim:

1. In an electrical indicator for pulverulent-material storage bins including an electric motor, a support therefor, an indicator arm, means for rotating said arm from the electric motor, said arm extending downwardly from the motor and adapted to have its lower end portion embedded in pulverulent material in the bin, rigid protecting means depending from said support and surrounding the arm for the major portion of the length thereof to shield it from contact with pulverulent material in the bin and means extending in a non-axial direction from the lower end portion of the arm beyond the rigid protecting means to engage pulverulent material when the lower end portion of the arm is embedded in such material in the bin; the improvement which comprises a universal mounting for the motor support, whereby the indicator arm and the rigid protecting means therefor can swing, with a shift of the pulverulent material in the bin, in any direction from the vertical.

2. An electrical indicator for pulverulent-material storage bins as set forth in claim 1 in which the universal mounting comprises concentric rings pivoted about mutually perpendicular axes.

3. In an electrical indicator for pulverulent-material storage bins including an electric motor, a housing therefor, said housing having a depending flange, an indicator arm, means for rotating said arm from the electric motor, said arm extending downwardly from the electric motor and adapted to have its lower end portion embedded in pulverulent material in the bin, rigid protecting means fastened to said depending flange and surrounding the indicator arm for the major portion of its length to shield it from contact with pulverulent-material in the bin and means extending in a non-axial direction from the lower end portion of the arm, beyond the rigid protecting means to engage pulverulent material when the lower end portion of the arm is embedded in such material in the bin; the improvement which comprises a universal mounting for the motor housing, whereby the indicator arm and the protecting means therefor can swing, with a shift of the pulverulent material in the bin, in any direction from the vertical.

4. An electrical indicator for pulverulent-material storage bins as set forth in claim 3 in which the universal mounting for the motor housing comprises concentric rings pivoted about mutually perpendicular axes.

JOSEPH B. GAFFNEY.